(12) United States Patent
Purohit et al.

(10) Patent No.: US 9,609,490 B2
(45) Date of Patent: Mar. 28, 2017

(54) UPDATING OF LAYER-2 GROUP KEY IN A WIRELESS NETWORK

(71) Applicant: GainSpan Corporation, San Jose, CA (US)

(72) Inventors: Sibasis Purohit, Bangalore (IN); Vishal Batra, Bangalore (IN); Pankaj Vyas, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 103 days.

(21) Appl. No.: 14/564,065

(22) Filed: Dec. 8, 2014

(65) Prior Publication Data
US 2016/0165410 A1  Jun. 9, 2016

(51) Int. Cl.
| H04W 4/08 | (2009.01) |
| H04W 12/04 | (2009.01) |
| H04L 29/06 | (2006.01) |
| H04L 12/18 | (2006.01) |

(52) U.S. Cl.
CPC ............ *H04W 4/08* (2013.01); *H04L 63/065* (2013.01); *H04L 63/068* (2013.01); *H04W 12/04* (2013.01); *H04L 12/189* (2013.01); *H04L 63/162* (2013.01)

(58) Field of Classification Search
None
See application file for complete search history.

(56) References Cited

U.S. PATENT DOCUMENTS

| 6,295,361 B1 | 9/2001 | Kadansky et al. |
| 2005/0050004 A1 | 3/2005 | Sheu et al. |
| 2008/0010242 A1* | 1/2008 | Jin .................. G06F 21/445 |
| 2010/0115278 A1 | 5/2010 | Shen et al. |
| 2014/0119543 A1 | 5/2014 | Yu et al. |
| 2014/0126722 A1* | 5/2014 | Qi .................. H04W 12/04 380/273 |
| 2014/0140511 A1 | 5/2014 | Suh et al. |

(Continued)

OTHER PUBLICATIONS

Configuring Authentication Types, "http://www.cisco.com/c/en/us/td/docs/wireless/access_point/12-2_13_JA/configuration/guide/i12213sc/s13auth.pdf", downloaded circa Oct. 23, 2014, pp. 1-18.

(Continued)

*Primary Examiner* — Diane Lo
(74) *Attorney, Agent, or Firm* — IPHorizons PLLC; Narendra Reddy Thappeta (57) ABSTRACT

According to an aspect of the present disclosure, an access point sends timing information related to updating of a group key. A wireless station communicates with the access point according to the timing information to receive an updated group key. The updated group key is thereafter used for processing of multicast packets. Due to the use of the timing information, the wireless station can operate in a power-down mode, and yet receive at least the required group keys. In one embodiment, the timing information specifies a future time instance at which the update group may be available. In an alternative embodiment, a version number is associated with each value of the group key and the version number of the currently operative group key (in the access point) is broadcast to the wireless stations.

20 Claims, 8 Drawing Sheets

(56) References Cited

U.S. PATENT DOCUMENTS

2014/0329498 A1* 11/2014 Cherian ............... H04W 12/06
　　　　　　　　　　　　　　　　　　　　　455/411
2014/0355763 A1* 12/2014 Lee ..................... G06F 13/10
　　　　　　　　　　　　　　　　　　　　　380/282

OTHER PUBLICATIONS

EAP-3660 11b/g Wireless Access Point, User's manual vsersion: 1.1, "http://pt.engeniustech.com/resources/EAP-3660-UsersManual-V1-1.pdf", date Jul. 22, 2008, pp. 1-33.
Hayriye Altunbasak and Henry Owen, Alternative Pair-wise Key Exchange Protocols for Robust Security Networks (IEEE 802.11i) in Wireless LANs, "http://users.ece.gatech.edu/owen/Research/Conference%20Publications/Altunbasak_Southeastcon2004.pdf", SoutheastCon, 2004. Proceedings. IEEE , Date of Conference:Mar. 26-29, 2004,pp. 77-83, Publisher:IEEE.
802.11g Wireless Outdoor Access Point/Ethernet Bridge user guide, "http://www.korenix.com/images/support/jetnet_data/JetWave2410-manual.pdf", downloaded circa Oct. 23, 2014, pp. 1-43.

* cited by examiner

UPDATING OF LAYER-2 GROUP KEY IN A WIRELESS NETWORK

BACKGROUND

Technical Field

Embodiments of the present disclosure relate generally to wireless networks, and more specifically to updating of a layer-2 group key in a wireless network.

Related Art

A wireless network may be viewed as various switches connecting wireless stations over a wireless medium. In a common scenario compliant with IEEE 802.11 standards, access points (APs) serve as switches communicating with wireless stations at layer-2 level in providing the connectivity to wireless stations. Layer-2 communication implies ensuring appropriate compliance to share the shared wireless medium, and also using medium access control (MAC) addresses to identify the sender and/or receiver in the corresponding hop of the communication.

Layer-2 group keys are often used in wireless networks for secure communication of multicast and broadcast packets between the APs and the wireless stations. Normally, the same group key is used by an AP to encrypt each packet transmitted to all associated wireless stations. Specifically the payload portion of the layer-2 multicast packet is encrypted using the group key, as is well known in the relevant arts.

There is a general need to update layer-2 group key in a wireless network. Updating implies changing the value for the group key such that the changed value is thereafter used for encryption (and decryption at the other end) of a multicast or broadcast packet. By updating the group key, security is enhanced, as is also well known in the relevant arts.

Aspects of the present disclosure are directed to updating of layer-2 group key in a wireless network.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, an access point sends timing information related to updating of a group key. A wireless station communicates with the access point according to the timing information to receive an updated group key from the access point. The updated group key is thereafter used for processing of multicast packets. Due to the use of the timing information, the wireless station can operate in a power-down mode, and yet obtain at least the required group keys.

In one embodiment, the timing information specifies a future time instance at which the update group may be available. In an alternative embodiment, a version number is associated with each value of the group key and the version number of the currently operative group key (in the access point) is broadcast to the wireless stations. A wireless station may examine the received version number to determine whether to receive a next version of the group key to thereby obtain an updated group key.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
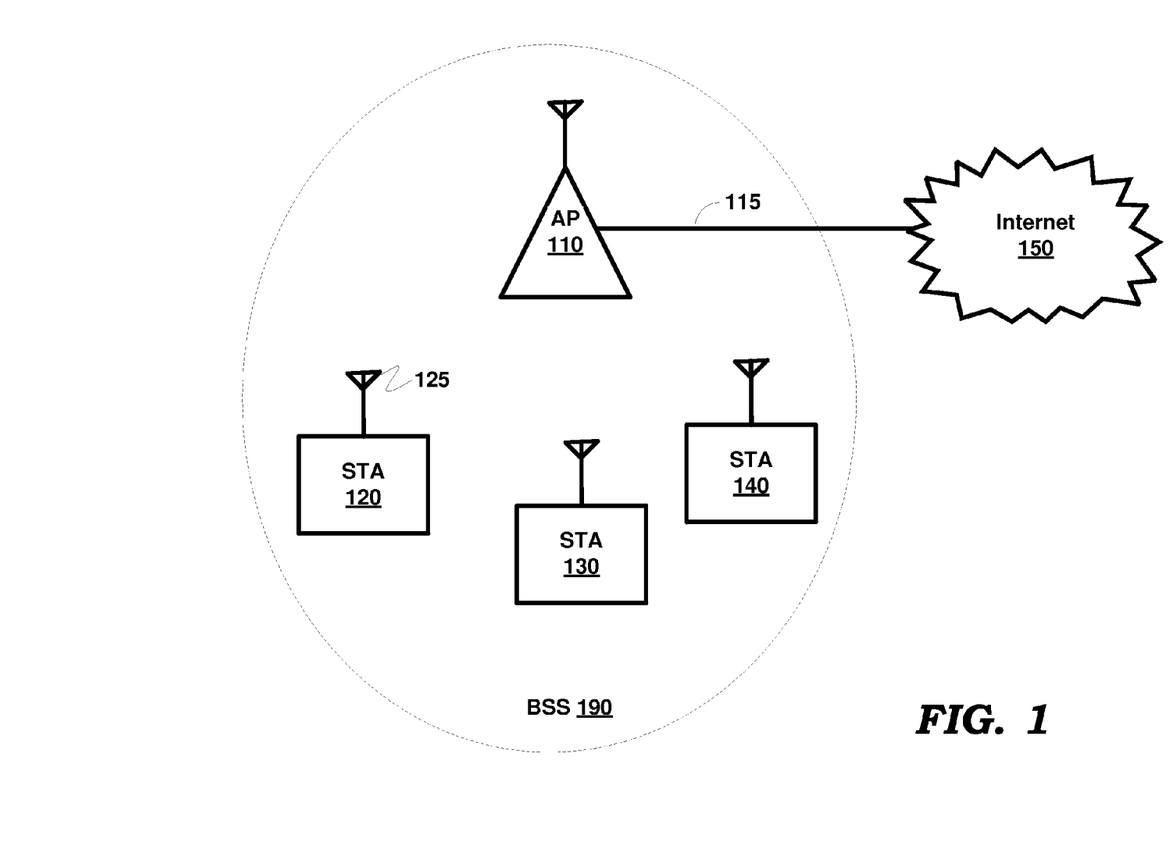
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems. FIG. 1 is shown containing access point (AP) 110, wireless stations (STA) 120, 130 and 140, and internet 150. AP 110 and STAs 120-140 are generically referred to herein as wireless devices. STA 120 is shown containing antenna 125. AP 110, STA 130 and STA 140 are also shown containing antennas, but not numbered.

Although, only three STAs are shown, the environment of FIG. 1 may contain more or less than three STAs also. Further, in the description below, the devices and the environment are described as operating consistent with Wireless Local Area Network (WLAN) according to IEEE 802.11 standard(s), merely for illustration. Implementations in other environments are also contemplated to be within the scope and spirit of various aspects of the present invention.

Internet 150 extends the connectivity of STAs 120-140 to various systems (not shown) connected to, or part of, internet 150. Internet 150 is shown connected to access point (AP) 110 through a wired path 115. STAs 120-140 may access devices/systems in internet 150 via AP 110. Internet 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Block 190, shown containing AP 110 and STAs 120, 130 and 140, represents a basic service set (BSS) of an infrastructure mode wireless network consistent with the IEEE 802.11 standard. Although only a single BSS is shown and described, other environments may include more than one BSS, with the BSSs being interconnected to form an extended service set (ESS) consistent with IEEE 802.11 standards, as is well known.

Each of STAs 120 through 140 represents an end device of wireless network (BSS 190), and may be the source or destination (i.e., consumer) of data packets (data units). Each STA may receive respective keys for encryption/decryption of unicast and multicast packets. For encryption/decryption of unicast packets, the unicast related keys may be used. For encryption/decryption of the of multicast (including broadcast) packets, the group keys may be used.

AP 110 represents a switching device (layer-2 switch), and forwards data packets received from one STA to another STA. AP 110 also forwards data packets received from any of the STAs and destined for a device(s) in internet 150. AP 110 may receive data packets from internet 150 and forward the data packets to the corresponding destination STA(s). AP 110 may maintain a list of associated (and authenticated) STAs in an association table maintained internally in AP 110. The association table may contain association information such as for example, the MAC addresses of the associated STAs, PTK key for each associated station, the data rate to be used when communicating with the STAs, etc. Further, AP 110 may perform various other operations consistent with IEEE 802.11 (WLAN) standards, as is well known in the relevant arts.

AP 110 may forward multicast/broadcast packets to STAs. A multicast packet refers to a packet intended for reception by more than one end device (e.g., STA 120 and STA 130) served by AP 110, while a broadcast packet refers to a packet intended for reception by all the end devices (STA 120, STA 130 and STA 140) served by AP 110. AP 110 encrypts a multicast/broadcast packet using a layer-2 group key (referred to herein simply as 'group key'). AP 110 transmits the group key in a unicast manner to each STA in the wireless network (here BSS 190).

On receipt, the corresponding STA decrypts the multicast/broadcast packet using the group key, For enhanced security, AP 110 may change the value of the group key at corresponding intervals, and transmit in a unicast manner the new (updated) value of the group key to each of STAs 120, 130 and 140.

A STA may be operated in power-down mode. In the power-down mode, one or both of the WLAN receiver and WLAN transmitter of the STA may be powered-OFF. Typically, the duration (termed sleep-interval in the context of IEEE 802.11) for which a STA is maintained in the power-down mode (before switching back to power-ON/active mode, in which at least the WLAN receiver is powered-ON), may be sent to the AP (AP 110 in the environment of FIG. 1) at the time of association. The AP may then buffer data intended for the STA for the duration of the sleep-interval.

However, there are often durations in which the sleep-intervals negotiated for STAs are fairly long, and APs may not have buffering capability to store the data intended for the stations (including the group key) for such a long duration. Thus, when a STA is not designed to wake up frequently enough for receiving the data (including group key) buffered in an AP, the AP may 'remove' or dissociate the STA from the wireless network, and may not process or forward data packets received from the STA or intended for the STA.

Several aspects of the present disclosure are directed to techniques for updating of layer-2 group key in a wireless network, and for ensuring receipt of the group key at a corresponding STA(s), as described next with respect to a flowchart.

3. Obtaining Group Keys

Figure 2:
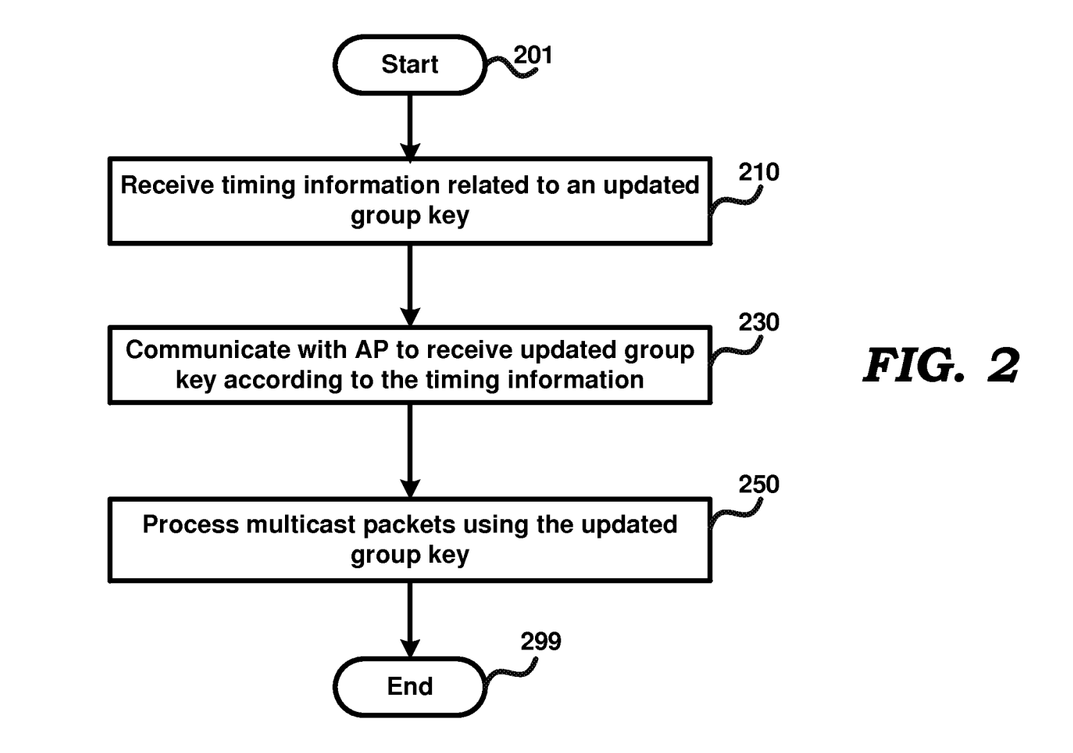
FIG. 2 is a flow chart illustrating the manner in which a STA operates to obtain a group key from an AP, in an embodiment of the present disclosure.

FIG. 2 is a flow chart illustrating the manner in which a STA operates to obtain a group key from an AP, in an embodiment of the present disclosure. Merely for illustration, the flowchart is described below as being performed in STA 120. However, the features can be implemented in STAs 130 and 140, as well as in other systems and environments without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, STA 120 receives timing information related to an updated group key from AP 110. The timing information either expressly indicates at what future time instant a new (updated) group key will be available for transmission to STA 120, or indicates that a newer group key is already effective from a prior time instant. Either of the two indications may be processed by STA 120 to obtain the updated group key, as described below in detail. Control then passes to step 230.

In step 230, STA 120 communicates with AP 110 to receive the updated group key according to the timing information. The manner in which such communication occurs is described below with examples. It is noted that in embodiments of the present disclosure, step 210 necessarily precedes step 230. Thus, STA 120 always receives the timing information first, and only then (based on the timing information) communicates with AP 110 to obtain the group key. Control then passes to step 250.

In step 250, STA 120 processes multicast (and/or broadcast) packets using the updated group key. STA 120 may thus decrypt a multicast or broadcast packet using the updated group key (obtained in step 230), and processes the multicast or broadcast packet. Control then passes to step 299, in which the flowchart ends.

Due to the availability of the timing information, STA 120 may be able to operate in a power-down mode and yet timely obtain the group key when the key is available in AP 110. The flowchart described above can be implemented in various ways, as suitable in the corresponding environments. The description is continued with respect to some examples below.

4. Timing Diagrams

As noted above, in an embodiment, the timing information expressly indicates at what future time instant a new (updated) group key will be available for transmission to STA 120. In the embodiment, such express indication is provided by AP 110 to STA 120 immediately after association and authentication with AP 110, during a 4-way handshake according to WPA2 (WiFi Protected Access II, as specified in IEEE 802.11i-2004) procedure, and thereafter during a 2-way handshake also according to WPA2 procedure.

Figure 3:
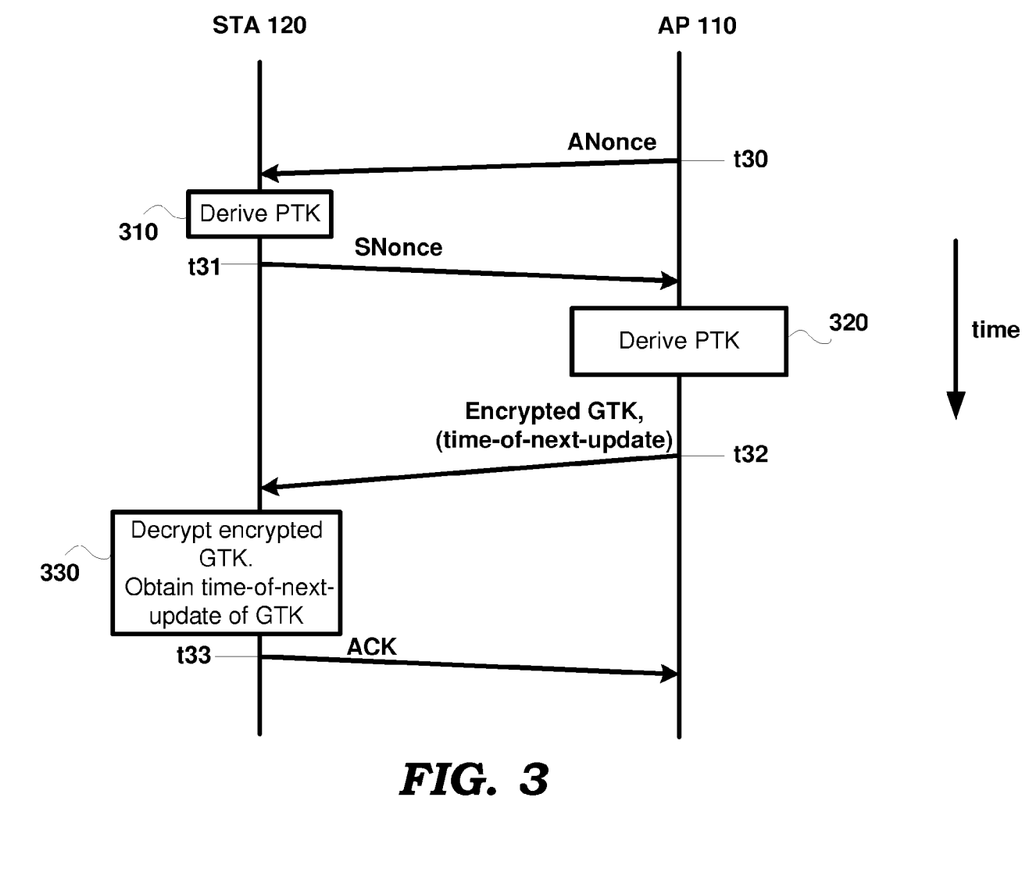
FIG. 3 is a diagram illustrating a 4-way handshake between a STA and an AP, in an embodiment of present disclosure.

The 4-way handshake of WPA2 is described in detail in the IEEE 802.11i-2004 standard, and is only briefly summarized herein with respect to FIG. 3, which illustrates a 4-way handshake between STA 120 and AP 110 according to WPA2. Prior to the commencement of 4-way handshake according to WPA2, each of STA 120 and AP 110 is assumed to have derived a pre-shared key (PSK) based on the passphrase (provided to STA 120 by AP 110, for example using WPS or Wi-Fi Protected Setup), and a pair-wise master key (PMK) based on the PSK, according to the WPA/WPA2 specifications.

As shown in FIG. 3, at time instant t30, AP 110 transmits a random number (ANonce) to STA 120. Based on ANonce, another random number SNonce (internally generated), the PMK, and the MAC addresses of both STA 120 and AP 110, STA 120 generates (as indicated in box 310) a pair-wise transient key (PTK). AP 110 and STA 120 may obtain each other's MAC addresses during association.

At t31, STA 120 transmits SNonce to AP 110. AP 110 then derives (box 320) the PTK (same as that generated by STA 110) based on ANonce, SNonce, the PMK and the MAC addresses of STA 120 and AP 110. The PTK is used for encryption and decryption of unicast messages exchanged between STA 120 and AP 110.

AP 110 encrypts a group key (GTK or Group Temporal Key in IEEE 802.11 parlance) using the PTK, and transmits, to STA 120 at t32, an Extensible Authentication Protocol over Local Area Network or EAPOL-key frame, containing the encrypted group key as well as the next time instant (time-of-next-update) at which the group key will be changed. The group key may have been generated earlier by AP 110 using a random number. However, if the group key has not yet been generated, then AP 110 may generate the group key also as part of the operations in box 320.

As indicated in box 330, STA 120 decrypts the received GTK using the PTK obtained earlier, and obtains the 'time-of-next-update'. At t33, STA 120 sends an acknowledgement to AP 110. At the end of the 4-way handshake, the PTK, the group key and the time-of-next-update are available at STA 120.

Figure 4:
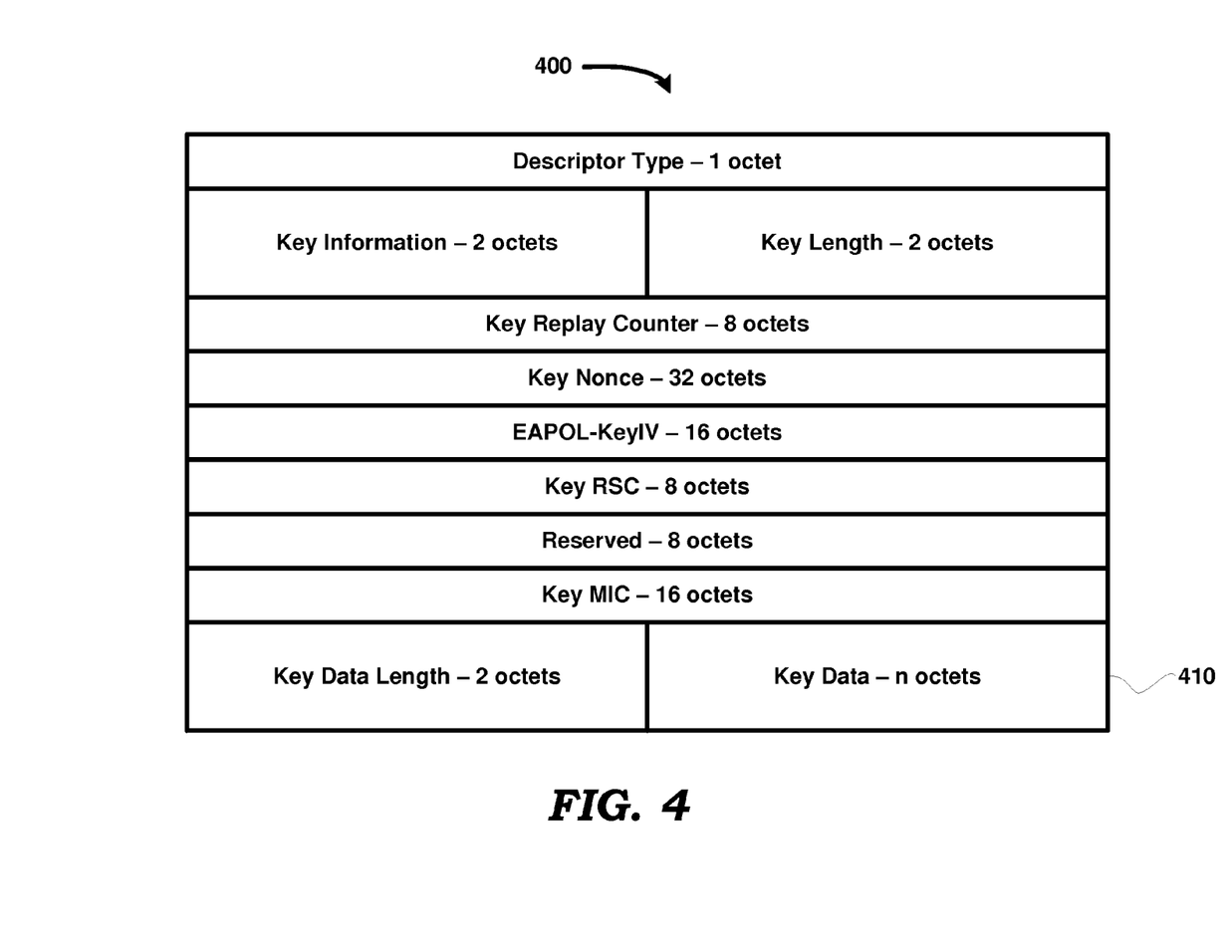
FIG. 4 is a diagram of the format of an EAPOL packet specified by IEEE 802.11i.

FIG. 4 shows the format of an EAPOL message 400 as specified by IEEE 802.11 standards. Each field of EAPOL message 400 is described in detail in section 8.5.2 (EAPOL-Key frames) of IEEE Std 802.11i-2004 document, and hence not described again herein. In the embodiment, AP 110 transmits the time-of-next-update as a "vendor OUI" sub-field of the "Key Data" field (field 410 in FIG. 4) of the EAPOL message. The vendor OUI sub-field is shown in table 20h in section 8.5.2 of IEEE 802.11i standard, noted above.

Figure 5:
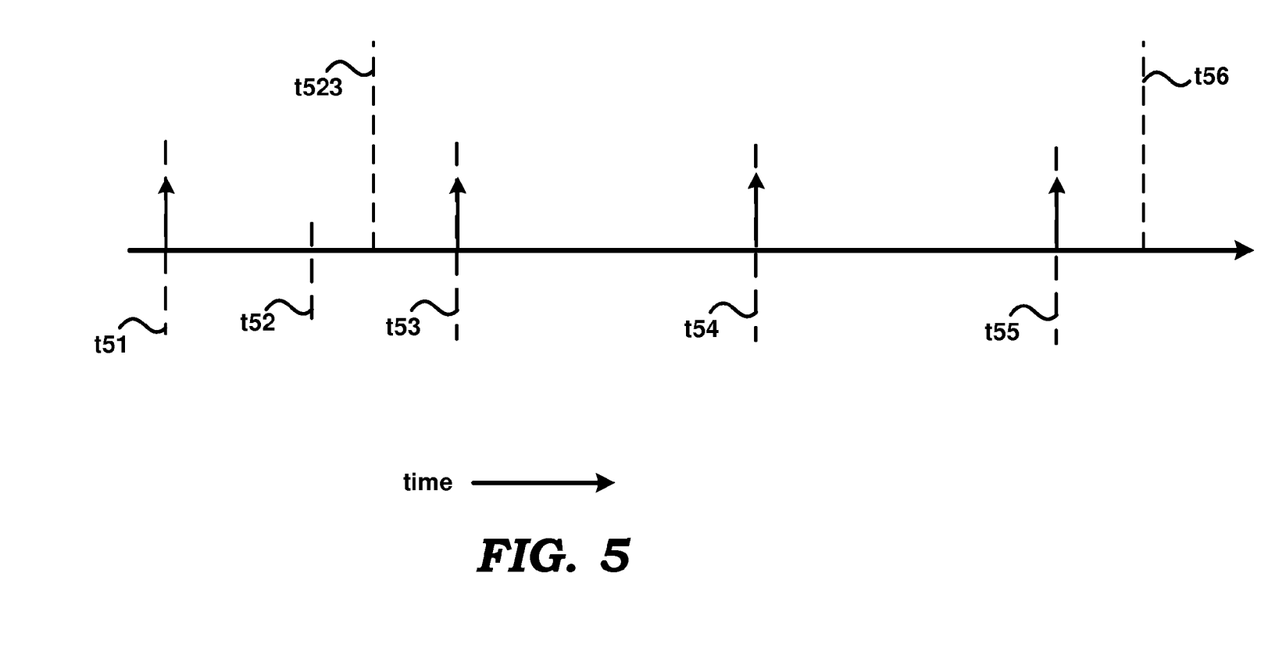
FIG. 5 is a timing diagram illustrating the manner in which a STA obtains group keys from an AP, in an embodiment of the present disclosure.

FIG. 5 is a timing diagram used to illustrate the operation of STA 120 in obtaining group keys. In FIG. 5, the vertical arrows at t51, t53, t54 and t55 denote time instants at which AP 110 changes the group key. It is assumed in FIG. 5 that STA 120 joins BSS 190 (by associating with AP 110) at time instant t52. At or slightly later than t52, STA 120 obtains the next time instant (time-of-next-update) at which the group key will be updated (time instant t53 in FIG. 5) in the 4-way handshake described above.

Further updates (e.g., at t54 and t55) to the group key are communicated by AP 110 to STA 120 in corresponding 2-way handshakes (also termed group key handshakes) specified by WPA2. The 2-way handshake is described in detail in the IEEE 802.11i-2004 standard, and is only briefly summarized herein with respect to FIG. 6. AP 110 initiates the 2-way handshake. As depicted in box 610, AP 110 generates a new group key (GTK), encrypts the new GTK with the current PTK, and transmits, to STA 120 at t61, an EAPOL-key frame, containing the encrypted group key as well as the time-of-next-update. The time-of-next-update may be contained in the "vendor OUI" sub-field of the "Key Data" field (field 410 in FIG. 4) of the EAPOL message.

Figure 6:
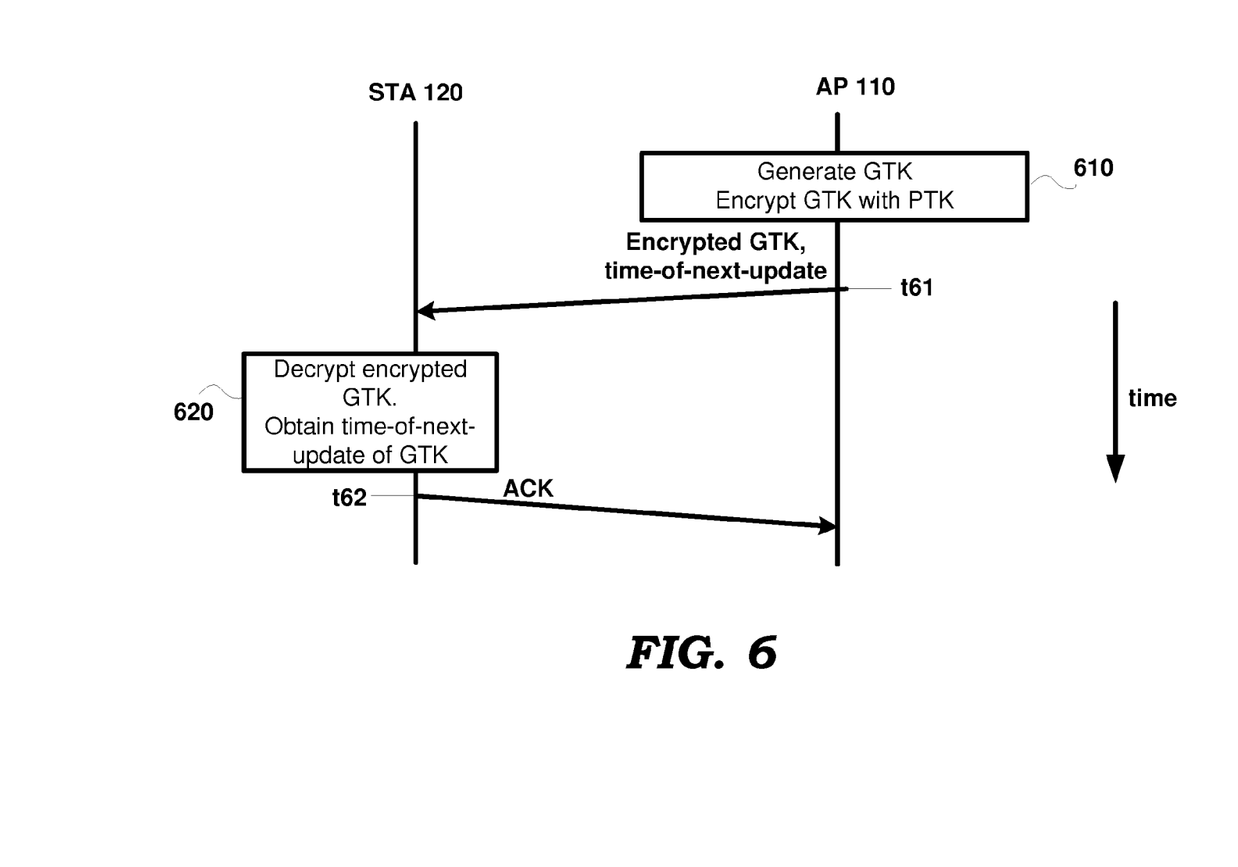
FIG. 6 is a diagram illustrating a 2-way handshake between a STA and an AP, in an embodiment of present disclosure.

STA 120 decrypts the encrypted new GTK and receives the time-of-next-update, as indicated by box 620. STA 120 then transmits an acknowledgement (ACK) to AP 110 at t62. Thus, with respect to FIG. 5, at t53, STA 120 receives a new group key as well as the time-of-next-update (t54) Similarly, at t54, STA 120 receives a new group key as well as the time-of-next-update (t55).

Thus, STA 120 is made aware of the time instants of group key updates. Hence, even if operating in power down-mode for long intervals (e.g., STA 120 can be temporarily transition to the active mode at the group key update instants (t53, t54, t55) and receive the updated group key. Hence, the problem of potential de-authentication by AP 110, as noted above, may be avoided. STA 120 may use the corresponding group keys in corresponding intervals to decrypt multicast or broadcast packets.

In another embodiment of the present disclosure, the timing information of step 210 of the flowchart of FIG. 2 indicates that a newer group key is already effective from a prior time instant. The manner in which STA 120 obtains updated group keys in such an embodiment is described next.

5. Group Key Version Number

In an embodiment of the present disclosure AP 110 transmits a version number (also termed group key identifier) of the currently valid (and used) group key in a vendor-specific information element (IE) of beacons. As is well known in the relevant arts, beacons are transmitted periodically by APs to indicate their availability such that new wireless stations can associate with the AP and thereafter be part of the wireless network. The manner in which STA 120 obtains a group key by making use of the group key version number is illustrated next with the example timing diagram of FIG. 7.

Figure 7:
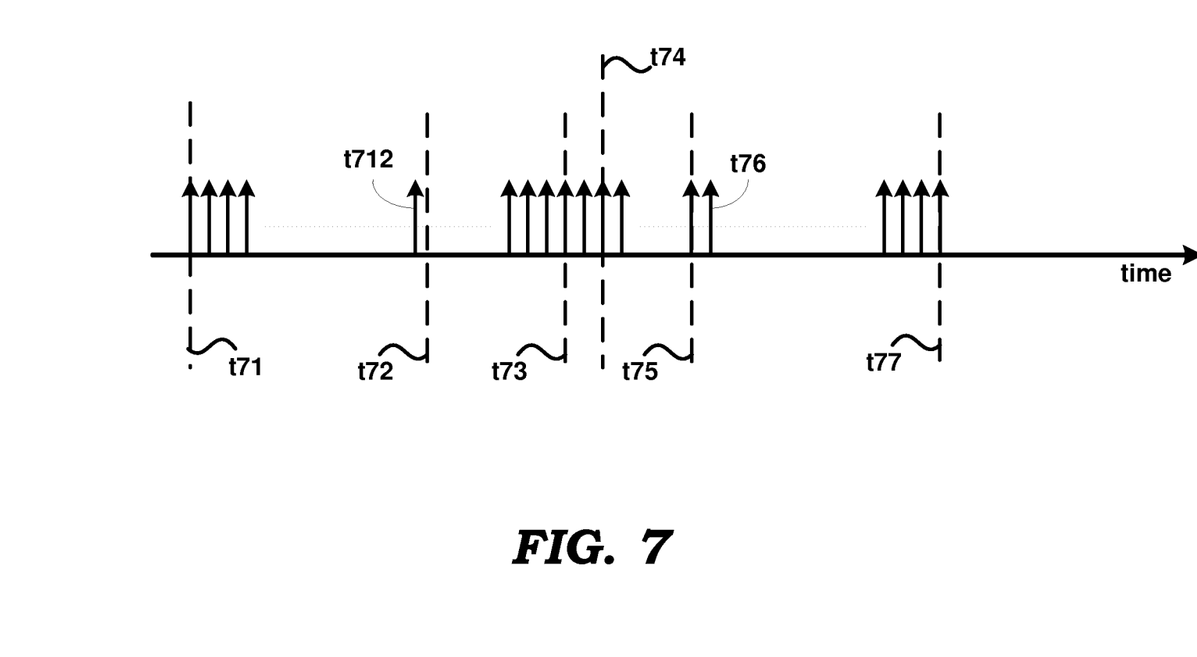
FIG. 7 is a timing diagram illustrating the manner in which a STA obtains group keys from an AP, in another embodiment of the present disclosure.

It is assumed that AP 110 regularly updates the group key at time instants t71, t73 and t77. In addition, AP 110 updates the group key value when a node (such as 1STA 130 or STA 140) leaves BSS 190 (i.e., dissociates from the BSS). An example of such an occurrence is shown at t74. Thus, STA 130 or STA 140 leaves BSS 190 at t74, and AP 110 changes the group key (last changed at t73) at or slightly after t74.

Beacon transmissions from AP 110 are indicated by vertical arrows in FIG. 7, and contain in a vendor specific IE field, the version number of the currently valid group key. Thus, beacons transmitted between t71 and t72 would contain the version number (say v-gk.1) of the group key (say GTK 1) generated at t71. Similarly, beacons transmitted between t73 and t74 would contain the version number (say v-gk.2) of the group key (say GTK2) generated at t73. Beacons transmitted between t74 and t77 would contain the version number (say v-gk.3) of the group key (say GTK3) generated at t74.

It is assumed that STA 120 transitions to power-down mode at t72. Prior to operating in the power-down mode, STA 120 is assumed to have obtained the group key generated at t71, as well as the corresponding version number v-gk.1 by t712. STA 120 continues to operate in power-down mode till t73. At or slightly before t73, STA 120 briefly transitions to active mode and obtain the new group key (GTK2) generated at t73, as well as the corresponding version number v-gk.2. STA 120 may have obtained the time of update t73 according to the embodiment described earlier above. STA 120 then transitions back to power-down mode and remains in power-down mode till t75, at which time STA 120 transitions to active mode.

It may be observed that STA 120 has missed receiving the group key GTK3 generated at t74. Such missing may occur when STA 120 expects AP 110 to change the group key only at regular intervals at which STA 120 obtains the time-of-next-update as noted with respect to the embodiment described earlier above. As a result, AP 110 could potentially de-authenticate and dissociate STA 120, for example because STA 120 was not in active mode to receive the group key GTK3. De-authentication implies that AP 110 would no longer forward data to/from STA 120 from/to other devices (e.g., STA 130, STA 140 or devices in internet 150). Dissociation implies that AP 110 removes association information regarding STA 120 from an association table maintained in AP 110.

In some implementations/scenarios, AP 110 may not dissociate STA 120, but may only de-authenticate STA 120, i.e., AP 110 may stop forwarding data to/from STA 120 from/to other devices (e.g., STA 130, STA 140 or devices in internet 150).

In either of the two conditions noted above, STA 120 may effectively be prevented from operating normally as a part of BSS 190.

However, in the embodiment noted above, on waking up at t74, STA 120 obtains the currently valid version number v-gk.3 of the current group key (GTK3) from the beacon transmitted at t75 or a next beacon at t76. STA 120 compares the new version number v-gk.3 with the old version number v-gk.2 in its possession, and concludes that the group key value has been updated, and that STA 120 does not possess the latest group key.

In response to such conclusion, STA 120 dissociates and then re-associates with AP 110, and obtains the latest group key in a modified version of the 2-way handshake illustrated in FIG. 6. In the modified handshake, STA 120, rather than AP 110 initiates the handshake.

Referring to FIG. 6, in the modified 2-way handshake of the embodiment, STA 120 first sends a request to AP 110 to initiate the 2-way handshake shown in FIG. 6. Any suitable pre-arranged message format may be used by STA 120 to make the request to AP 110. AP 110 may be modified to be able to receive such a request, and in response initiate the 2-way handshake. At the end of the modified 2-way handshake, STA 120 obtains the new group key, as well as the time-of-next-update. STA 120 may use the corresponding group keys in corresponding intervals to decrypt multicast or broadcast packets. STA 120 may receive further updates of the group key as well as time-of-next-update according to the 2-way handshake of FIG. 6.

The implementation details of a wireless station (STA) in an embodiment of the present disclosure are provided next.

6. Example Implementation

Figure 8:
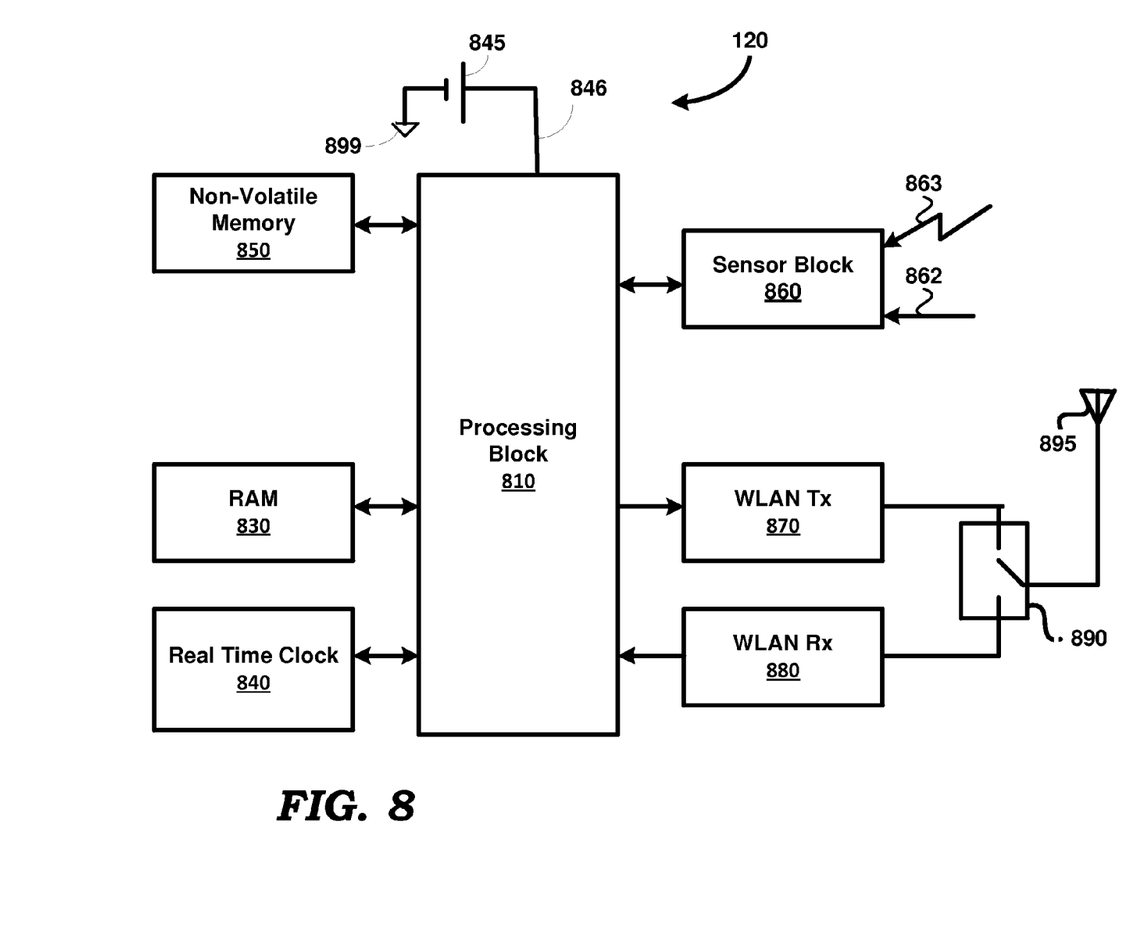
FIG. 8 is a block diagram illustrating the implementation details of a wireless station in an embodiment.

FIG. 8 is a block diagram showing the implementation details of a wireless station in an embodiment of the present disclosure. STA 120 is shown containing processing block 810, random access memory (RAM) 830, real-time clock (RTC) 840, battery 845, non-volatile memory 850, sensor block 860, WLAN transmitter (Tx) 870, WLAN receiver (Rx) 880, switch 890, and antenna 895. The whole of STA 120 may be implemented as a system-on-chip (SoC), except for battery 845 and antenna 895. Alternatively, the blocks of FIG. 8 may be implemented on separate integrated circuits (IC).

Battery 845 provides power for operation of STA 120, and may be connected to the various blocks shown in FIG. 8. Although not shown in FIG. 8, STA 120 contains corresponding circuitry (such as power switches, for example) for selectively powering-ON and powering-OFF WLAN Rx 880, and (optionally) WLAN Tx 870 also. RTC 840 operates as a clock, and provides the 'current' time to processing block 810. RTC 840 may be programmed by processing block 810 to signal (by way of interrupts) when STA 120 is to enter power-down and active modes. Terminal 899 represents a ground terminal.

Sensor block 860 may contain one or more sensors, as well as corresponding signal conditioning circuitry, and provides to processing block 810, measurements/values of physical quantities such as temperature, pressure, etc., sensed via wired path 862 or wireless path 863.

Antenna 895 operates to receive from, and transmit to, a wireless medium, corresponding wireless signals according to IEEE 802.11 (WLAN) standards. Switch 890 may be controlled by processing block 810 (connection not shown) to connect antenna 895 to one of blocks 870 and 880 as desired, depending on whether transmission or reception of WLAN signals is required. Switch 890, antenna 895 and the corresponding connections of FIG. 8 are shown merely by way of illustration. Instead of a single antenna 895, separate antennas, one for transmission and another for reception of WLAN signals, can also be used. Various other techniques, well known in the relevant arts, can also be used instead.

WLAN Tx 870 receives data to be transmitted according to WLAN standards from processing block 810, generates a modulated radio frequency (RF) signal according to IEEE 802.11 standards, and transmits the RF signal via switch 890 and antenna 895. WLAN Tx 870 may contain RF and baseband circuitry for generating and transmitting WLAN signals, as well as for medium access operations. Alternatively, WLAN Tx 870 may contain only the RF circuitry, with processing block 810 performing the baseband and medium access operations (in conjunction with the RF circuitry).

WLAN Rx 880 represents a receiver that receives an RF signal (according to IEEE 802.11/WLAN standards) bearing data and/or control information via switch 890, and antenna 895, demodulates the RF signal, and provides the extracted data or control information to processing block 810. WLAN Rx 880 may be implemented according to one of several well known approaches. Thus, for example, WLAN Rx 880 may contain RF as well as baseband processing circuitry for processing a WLAN signal. Alternatively, WLAN Rx 880 may contain only the RF circuitry, with processing block 810 performing the baseband operations in conjunction with the RF circuitry. WLAN Rx 880 may selectively be powered OFF and powered ON by controlling (by processing block 810, for example) corresponding circuitry, such as power switches (not shown), connecting WLAN Rx 880 to battery 845. Further, when WLAN Rx 880 includes baseband processing circuitry, such circuitry may also be selectively powered OFF and powered ON. Alternatively, the master clock provided for operation of such baseband circuitry may be capable of being gated OFF and gated ON by corresponding circuitry.

Non-volatile memory 850 is a non-transitory machine readable medium, and stores instructions, which when executed by processing block 810, causes STA 120 to operate as described above. In particular, the instructions enable STA 120 to operate as described with respect to the flowchart of FIG. 2, when implemented correspondingly.

RAM 830 is a volatile random access memory, and may be used for storing instructions and data. In addition, RAM 830 may be used to store the time-of-next update of group keys, group keys and version numbers of the group keys. Processing block 810 may retrieve such information to cause STA 120 to operate to obtain updated group keys as described in detail above.

Processing block 810 (or processor in general) may contain multiple processing units internally, with each processing unit potentially being designed for a specific task. Alternatively, processing block 810 may contain only a single general-purpose processing unit. Processing block 810 may execute instructions stored in non-volatile memory 850 or RAM 830 to enable STA 120 to operate according to several aspects of the present disclosure, described above in detail. Processing block 810 may operate to place STA 120 in power-down mode or active mode, by issuing control signals to selectively power-ON/power-OFF WLAN Rx 880 and/or WLAN Tx 870. Processing block 810 may forward sensed parameters from sensor block 860 to WLAN Tx 870 for transmission via switch 890 and antenna 895 to a corresponding device in BSS 190 or internet 150.

RAM 830 and non-volatile memory 850 (which may be implemented in the form of read-only memory/ROM/Flash) constitute computer program products or machine (or computer) readable medium, which are means for providing instructions to processing block 810. Thus, such medium can be in the form of removable (floppy, CDs, tape, etc.) or non-removable (hard drive, etc.) medium. Processing block 810 may retrieve the instructions, and execute the instructions to provide several features of the present disclosure.

While the block diagram of FIG. 8 is noted as representing a wireless station, the same block diagram with corresponding modifications can represent an access point (e.g., AP 110) also. When representing an AP (e.g., AP 110 of FIG. 1), sensor block 860 may not be implemented, and FIG. 8 may additionally contain a network interface to provide a wired connection (via path 115 of FIG. 1) to internet 150.

FIG. 8 may additionally contain user interfaces such as input and output interfaces to enable a user to interact with AP 110. RAM 830 may be used to buffer group keys prior to transmission to the corresponding STA, as described in detail above. However, AP 110 may operate only in active mode in all durations, without the power-down mode noted above. Non-volatile memory 850 stores instructions, which when executed by processing block 810, causes AP 110 to operate as described above. Optionally, the blocks of FIG. 8 may be powered by a power supply derived from mains supply, rather than (or as an alternative to) being powered by battery 845.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless station of a wireless network, said method comprising:
   operating with a first key as a group key in a first duration;
   receiving from a layer-2 switch timing information related to an updated group key;
   communicating with said layer-2 switch, according to said timing information, to receive a second group key as said updated group key at a first time instant;
   processing multicast packets using said second group key after said first time instant.

2. The method of claim 1, wherein said timing information comprises a future time instant at which said updated group key is expected to be available in said layer-2 switch, wherein said first time instant is after said future time instant,
   wherein said wireless station operates in a power down mode for a duration before said future time instant and operates in active mode for said communicating and said processing.

3. The method of claim 2, wherein said wireless network is according to IEEE 802.11 protocol, and said layer-2 switch is an access point (AP).

4. The method of claim 3, wherein said future time instant is indicated in Key Data field of an EAPOL (Extensible Authentication Protocol over Local Area Networks) packet according to said IEEE 802.11 protocol.

5. The method of claim 4, wherein said wireless station participates in a 4-way handshake with said layer-2 switch to obtain the future time instant.

6. The method of claim 1, wherein said timing information comprises a version number of a group key currently used by said layer-2 switch,
   wherein said wireless station maintains a version number of said first key,
   wherein said wireless station compares said version number of said group key currently used by said layer-2 switch with said version number of said first key to identify that said updated group key is available on said layer-2 switch,
   wherein said communicating is performed after said identifying.

7. The method of claim 6, upon said identifying, said method further comprises:

dissociating and then re-associating with said layer-2 switch, wherein said communicating is performed as a part of said re-associating.

8. The method of claim 7, wherein said version number of said group key currently used by said layer-2 switch, is received from said layer-2 switch in an information element (IE) of a field of a beacon, wherein said communicating comprises a two-way handshake in which said second group key is received.

9. A non-transitory machine readable medium storing one or more sequences of instructions for enabling an access point (AP) to communicate multicast packets with wireless stations in a wireless network, wherein execution of said one or more instructions by one or more processors contained in said AP enables said AP to perform the actions of:

operating with a first key as a group key in a first duration;
generating a second key as an updated key for said group key;
transmitting timing information related to said updated key;
buffering said second key;
communicating with a wireless station to send said second key as said updated key at a first time instant; and
transmitting multicast packets to said wireless station encrypted with said second key after said first time instant.

10. The non-transitory machine readable medium of claim 9, wherein said timing information comprises a future time instant at which said updated key is expected to be available in said AP, wherein said first time instant is after said future time instant, wherein said wireless station operates in a power-down mode for a duration before said future time instant and operates in active mode for receiving said second key as said updated key.

11. The non-transitory machine readable medium of claim 10, wherein said wireless network is according to IEEE 802.11 standards.

12. The non-transitory machine readable medium of claim 11, wherein said future time instant is indicated in a Key Data field of an EAPOL (Extensible Authentication Protocol over Local Area Networks) packet according to said IEEE 802.11 standards.

13. The non-transitory machine readable medium of claim 9, wherein said timing information comprises a version number of a group key currently used by said AP, wherein said wireless station maintains a version number of said first key,
wherein said wireless station compares said version number of said group key currently used by said AP with said version number of said first key to identify that said updated key is available on said AP,
wherein said communicating is performed after said identifying.

14. The non-transitory machine readable medium of claim 13, upon said identifying at said wireless station, said actions further comprise:

communicating with said wireless station to enable said wireless station to dissociate and then re-associate with said AP, wherein said wireless station is de-authenticated, but not dissociated, prior to said communicating in view of said wireless station not retrieving said second key,
wherein said communicating causes said wireless station to be re-authenticated and re-associated.

15. The non-transitory machine readable medium of claim 14, wherein said version number of said group key currently used by said AP, is transmitted to said wireless station in an information element (IE) of a field of a beacon, wherein said communicating comprises a modified two-way handshake in which said second key is sent to said wireless station.

16. A wireless station of a wireless network, said wireless station comprising:

a processing block, a memory, and a receiver circuit,
said memory to store instructions which when retrieved and executed by said processing block causes said wireless station to perform the actions of:
operating with a first key as a group key in a first duration;
receiving, from a layer-2 switch, timing information related to an updated group key;
communicating with said layer-2 switch using said receiver circuit, according to said timing information, to receive a second group key as said updated group key at a first time instant;
processing multicast packets using said second group key after said first time instant.

17. The wireless station of claim 16, wherein said timing information comprises a future time instant at which said updated group key is expected to be available in said layer-2 switch, wherein said first time instant is after said future time instant, wherein said wireless station operates in a power-down mode for a duration before said future time instant and operates in active mode for said communicating and said processing,
wherein said receiver circuit is powered-OFF in said power down mode and powered-ON in said active mode.

18. The wireless station of claim 16, wherein said wireless network is according to IEEE 802.11 protocol, and said layer-2 switch is an access point (AP).

19. The wireless station of claim 16, wherein said timing information comprises a version number of a group key currently used by said layer-2 switch, wherein said processing block maintains a version number of said first key,
wherein said processing block compares said version number of said group key currently used by said layer-2 switch with said version number of said first key to identify that said updated key is available on said layer-2 switch,
wherein said communicating is performed after said identifying.

20. The wireless station of claim 19, wherein upon said identifying, said processor further performs the actions of:

dissociating and then re-associating with said layer-2 switch, wherein said communicating is performed as a part of said re-associating.

* * * * *